3,536,637
PROCESS FOR THE REJUVENATION OF FOULED ION-EXCHANGE MATERIALS
Charles A. Noll, Philadelphia, Pa., and Louis J. Stefanelli, Pennsauken, N.J., assignors to Betz Laboratories, Inc., Trevose, Pa., a corporation of Pennsylvania
No Drawing. Filed Sept. 3, 1968, Ser. No. 757,126
Int. Cl. B01d 15/06; C02b 1/76
U.S. Cl. 260—2.2                                                7 Claims

ABSTRACT OF THE DISCLOSURE

The present invention is directed to a process for rejuvenating iron fouled ion exchange materials. The process generally comprises contacting the iron fouled exchange material with an aqueous solution of oxalic acid. Preferably the aqueous solution contains from about 3% to about 10% by weight of the acid and is heated to a temperature of from about 110° F. to 170° F.

BACKGROUND OF THE INVENTION

Natural and synthetic ion exchange materials have been in use for many years in the water purification and water treatment fields. The value of these materials in these particular fields needs little comment since the worker in the art is well aware of their attributes and is also aware of some of the problems associated therewith.

The present invention is directed to one of the problems which is customarily found in the use of these materials. This problem is commonly referred to as the iron fouling of the exchange material with no distinction as to whether the material affects cation or anion exchange or whether the material is organic or inorganic in composition. Most water sources contain iron in one form or another and either in a water insoluble or water soluble state. The water insoluble iron compounds such as iron oxide are the most troublesome. However, the characteristics of some water soluble forms of iron are to be contended with also, since these water soluble salts of iron such as ferrous bicarbonate upon contact with air either in the system itself or with the atmospheric oxygen will readily convert the iron to its water insoluble oxidized form. The insoluble forms which are generally encountered are the feric oxides and hydroxides.

When water containing these iron compounds, and in particular the iron oxides and hydroxides are passed through an exchange material whether it be to remove cations or anions or a combination of the two, the insoluble iron compounds deposit upon the beads or particles of the resin to form a coating which eventually effectuates a plugging of the resin.

This occurrence is particularly common in the water treatment field where high quantities of water are softened by ion exchange before introduction into either a steam generating system or a cooling system.

It is to be pointed out that although a description of the fouling agent has been given above as being the insoluble iron oxides or hydroxides, the worker in the art is well aware of the fact that fouling can be caused by such insolubles as aluminum oxide ($Al_2O_3$), or hydroxide or manganese oxide ($Mn_2O_3$) or hydroxide and combinations of the compounds. Accordingly for the purpose of this application, it is intended that the terminology "iron fouling" include mixtures of the insoluble iron compounds with the aforementioned insoluble compounds.

The mechanism of ion exchange is well known and accordingly, little comment in this regard is necessary. However as a brief explanation of the effects of insoluble iron deposits on the resin, it should be pointed out that the insoluble iron when deposited effectively poisons the resin. More specifically, the ion exchange resin possesses centers which when contacted with a solution containing another ion exchanges its ion for the ion of the solution to thereby remove the undesired ion.

As is readily apparent, if the insoluble iron deposits upon a center of exchange, a barrier is produced which prohibits the contact of the center with the solution containing the ion to be removed which is a necessity for the efficient and proper function of the resin.

If sufficient deposition, plugging or fouling by the insoluble iron occurs, the effectiveness of the exchange material is greatly and expensively reduced and in many cases its effectiveness is completely lost.

The art is well aware of the problems caused by iron fouling as is evidenced by the full description given in U.S. Pat. 3,078,224 and many solutions for the problem have been recommended. However, most of the solutions recommended possess atttendant disadvantages in one form or another. For example, a treatment may successfully remove the iron deposits and restore the exchange material to what is believed to be its normal condition. However, upon further investigation, it is generally found that the beads of exchange material have been split, the material is degrated due to attack by the treatment itself and/or the exchange material is friated due to the rejuvenation treatment.

The friation of an exchange material is to be avoided since the cost of a typical ion exchange resin is quite high. The size of the particles of a resin which yields the preferred flow ranges from about 20 to about 50 mesh (U.S. Standard Screen Scale). Friation of the resin results in the creation of resin fines and such fines have a tendency to be suspended and be carried away with the liquid medium, a result which is undesirable from the aspect of efficiency and cost of exchange and from the standpoint of effluent-purity.

Accordingly, the discovery of a treatment or composition which would permit the successful rejuvenation of an iron fouled exchange resin would be an advancement of the art. However, the discovery would have to insure the art that the iron deposits can be removed without any attendant, significant deleterious effects on the exchange material. Moreover, it would be desirable that the treatment or treating composition could be utilized without the care and concern which is normally a part of some of corrosive type treatments which are currently in use.

GENERAL DESCRIPTION OF THE INVENTION

With the foregoing objectives in mind and realizing that the treatment of iron bearing waters previous to their passage through exchange materials are uneconomical and most times ineffective, applicants initiated an extensive research program in an attempt to ascertain a treatment or composition which would fulfill the necessary prerequisites. During the study applicants discovered that the iron oxides which foul the various types of ion exchange materials could be readily solibilized and removed by use of a contact process wherein oxalic acid was used as the treating agent. Although the initial discovery was made by treatment of a synthetic cation exchange resin, when other commercially available exchange materials were tested, it was determined that the treatment was entirely successful.

The results obtained were approximately the same whether the samples were iron fouled organic anion exchange resins or iron fouled inorganic natural or synthetic ion exchangers, such as aluminum silicate, gel zeolites, sodium zeolites. The iron fouled organic exchange resins treated included such well known materials as the phenol-formaldehyde cation exchange resins (Amberlite IR–100H), the carboxylic acid containing resins commonly referred to as the weakly acidic cation exchangers or those prepared by the suspension copolymerization of methacrylic acid and divinyl benzene (Amberlite IRD–50), the weakly basic anion exchangers obtained by the reaction of phenols with formaldehyde and a polyalkylene amine. Since cation exchange resins such as the natural zeolites (sodium aluminum silicate), the sulfonated polystyrene resins and the sulfonated phenolic resins such as Amberlite IR–120, are the most commonly used resins for water softening these materials were studied extensively.

The treatments used were studied from a dual aspect, the first being, of course, the quantity of the iron removed and secondly, the condition of the exchange material after treatment.

In all cases it was established that the treatment was clearly effective in removing the iron deposits and in leaving an exchange material whose original characteristics were substantially unchanged.

The treatment comprised generally the contacting of the iron fouled exchanger with an aqueous solution containing from about 3 to about 10% by weight of oxalic acid. It was discovered that although a room temperature treatment was effective, a heated treatment was preferred. The normal contact period or treatment period ran from approximately 1 hour to 48 hours with the shorter time periods being appropriate when the oxalic acid solutions were heated to a temperature of from 110° to about 175° F.

softening system. The resin used became fouled with iron and mud after only short periods of usage and had to be replaced and accordingly the water softening process was quite expensive.

The resin was treated with various compositions and the percentage of iron on the beads before and after treatment was determined by means of X-ray fluorescence. The technique afforded a rapid and accurate means of evaluating the compositions as cleaning agents.

After exposure to an iron removing compound and normal regeneration using the correct volume of 10% solution of NaCl, the treated beads were tested for moisture content and combined exchange capacity. By evaluating the data obtained from the tests, the effect of the compound on the resin either deleterious or beneficial, was observed. The time of contact was 48 hours. The data in Table I indicates the condition of the bead after treatment.

Discussion: The following facts will be helpful interpreting the data given in Table I.

If the moisture content falls below the moisture specifications of the resin, the exchange sites on the bead are considered blocked by a coating. A high moisture content indicates excessive fragmentation. A high moisture and a low density indicates swelling of the bead. All of these conditions will effect the regenerative properties of the bead. The combined exchange capacity determines the number of exchange sites that have been poisoned.

TABLE I.—THE EFFECT OF THE COMPOUNDS ON THE PROPERTIES OF THE RESIN

| Compound | Percent moisture | Combined exchange capacity | | Percent iron as $Fe_2O_3$ present | Percent iron as $Fe_2O_3$ removed |
| | | Weight capacity, meq./g. (dry) | Volume capacity, meq./ml. (wet) | | |
| --- | --- | --- | --- | --- | --- |
| 5% sulfo salicylic acid | 51.4 | 5.14 | 2.01 | 5.8 | 22.7 |
| 5% oxalic acid | 52.7 | 5.29 | 2.01 | 2.0 | 73.5 |
| 5% citric acid | 51.8 | 5.18 | 2.00 | 5.8 | 22.7 |
| Gluconic acid (5%) | 51.4 | 5.14 | 2.01 | 6.8 | 9.3 |
| E.D.T.A. 5% (pH 3.5) | 52.2 | 5.15 | 1.97 | 6.5 | 13.3 |
| Amberlite IR 120 [1] | [2] 49–55 | [1] 5.0 | [1] 1.9 | | |

[1] As received from supplier.
[2] Minimum.

The conditions of treatment, for example, the oxalic acid content, the temperature of the oxalic acid solution and the contact time were entirely dependent upon the degree of fouling of the exchangers. In instances where the exchanger is highly fouled, it was preferred to use about a 5% to 10% by weight oxalic acid solution which was preheated to a temperature of about 140° F. A contact time of about 24 hours was quite effective.

If higher concentrations of oxalic acid were used, contact times of from 1 hour were utilizable although the longer contact times were preferred. In cases where the exchange material was not fouled to an extensive degree and there was no critical time problem, a treatment using an aqueous solution containing from about 3 to 5% by weight of oxalic acid was effective. The temperature of the solution was approximately room temperature and the contact time was about 48 hours.

In all instances, the treated exchange materials exhibited no deleterious effect from the treatment and after normal regeneration the exchange materials could be used effectively for the purpose of ion exchange. A more detailed explanation of the characteristics of the exchange materials after treatment is included below.

Having thus described the invention generally, specific embodiments thereof follow. However, the specific embodiments are included as representative with no intention of limiting the invention thereto.

PREFERRED EMBODIMENTS

Example 1

A sample of an iron-fouled cationic Amberlite IR–120 resin was obtained from a southeastern corporation which was concerned with the expenses related to their water From the data recorded in the foregoing table, it is evident that the compounds tested did not adversely affect the exchange material, since the specifications of the material after rejuvenation treatment and normal regeneration were quite close to the specifications of the material as furnished by the supplier. However, it is also clear from a comparison of the percentages of iron removed as $Fe_2O_3$ that the oxalic acid treatment was far superior to any of the other compounds tested.

Example 2

Example 1 was repeated with the exception that the oxalic acid solution was preheated to a temperature of approximately 140° F. and the contact period was shortened to about 24 hours.

The results obtained were quite similar to those as recorded in Table 1 for the oxalic acid treatment with the exception that the percentage of iron removed was slightly higher i.e. approximately 74.5%.

Example 3

Example 1 was repeated with the exception that the oxalic acid solution (at room temperature) was allowed to be in contact with the iron fouled material for a period of 24 hours, the percentage iron removed as $Fe_2O_3$, was about 70%.

In all of the above tests wherein a 5% solution of the compound was used, the amount of solution used was such as to insure that from about 2 to about 4 ounces of the active compound was present per cubic foot of exchange material, or on the basis of regeneration from about ⅛ to about ¼ lb. of active ingredient was used for each 5 lb. of regeneration salt i.e. NaCl.

We claim:

1. A process for the rejuvenation of a sulfonated copolymer of styrene and divinylbenzene cationic exchange resin which has been fouled with insoluble compounds of iron oxides or hydroxides or their mixtures with aluminum oxide or hydroxide and manganese oxide or hydroxide which comprises contacting said exchange resin with an aqueous solution of oxalic acid for a time sufficient to substantially remove said insoluble compounds.

2. A process according to claim 1 wherein the aqueous solution contains from about 3 to about 10 percent of weight of oxalic acid.

3. A process according to claim 2 wherein the aqueous solution is a heated solution.

4. A process according to claim 1 wherein the aqueous solution contains approximately 5 percent by weight of oxalic acid.

5. A process according to claim 4 wherein the exchange resin is contacted with the oxalic acid for a period of approximately 48 hours.

6. A process according to claim 5 wherein said aqueous solution is a heated solution.

7. A process according to claim 6 wherein the aqueous solution has a temperature of from about 110 to about 175° F.

References Cited

UNITED STATES PATENTS

| | | | |
|---|---|---|---|
| 3,216,931 | 11/1965 | Dennis et al. | 210—30 |
| 3,454,503 | 7/1969 | Blankenhorn et al. | 260—2.2 |

FOREIGN PATENTS

| | | |
|---|---|---|
| 861,981 | 2/1941 | France. |
| 6,609,227 | 1/1967 | Netherlands. |
| 242,263 | 9/1965 | Austria. |

OTHER REFERENCES

Dowex Ion Exchange, The Dow Chemical Co., Midland, Mich., 1964 (p. 62).

Isomatsu et al., Bull. Govt. Research Inst. Ceramics 2, No. 1, 14–16 (1948) Chem. Abstr. supplied.

Berlin, Tr. Vses. Nauchne-Issled. Geol. Inst. 72, 99–124 (1962). Chem. Abstr. supplied.

Chaberek et al., Organic Sequestering Agents, John Wiley & Sons, New York, 1959 (p. 337).

WILLIAM SHORT, Primary Examiner

M. GOLDSTEIN, Assistant Examiner

U.S. Cl. X.R.

210—32; 260—2.1